United States Patent
Humphrey (12)

(10) Patent No.: US 6,345,322 B1
(45) Date of Patent: Feb. 5, 2002

(54) INTELLIGENTLY INTERPRETING ERRORS IN BUILD OUTPUT LOG FILES

(75) Inventor: Randy Scott Humphrey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,227

(22) Filed: Dec. 18, 1998

(51) Int. Cl.[7] ................ G06F 17/30; G06F 11/00
(52) U.S. Cl. ............... 710/38; 714/30; 714/36; 714/37; 707/100
(58) Field of Search ............... 714/30, 36, 37, 714/38; 707/100

(56) References Cited

U.S. PATENT DOCUMENTS 6,138,121 A  * 10/2000 Costa et al. ............... 707/100
6,202,174 B1 *  3/2001 Lee et al. .................. 714/38

* cited by examiner

Primary Examiner—Thomas Lee
Assistant Examiner—Tammara Peyton
(74) Attorney, Agent, or Firm—Richard A. Henkler; Leslie A. Van Leeuwen; Bracewell & Patterson L.L.P.

(57) ABSTRACT

A method for identifying predefined error conditions in a build output log file to determine if software build is defective. An output log file is generated within a storage device of a data processing system during a build of a software algorithm on the data processing system. A user creates a list file on the data processing system containing predefined valid error conditions. The output log file is searched to identify user-defined strings from the list file. A comparison of the user-defined strings identified during the search is made with predefined valid error conditions to determine when the user-defined strings identified matches the predefined valid conditions.

27 Claims, 3 Drawing Sheets

INTELLIGENTLY INTERPRETING ERRORS IN BUILD OUTPUT LOG FILES

BACKGROUND OF THE INVENTION

1. Technical Field

The present invention relates to an improved method of developing software algorithms for a data processing system, and in particular to provide such an improved method of developing software algorithms for a data processing system by identifying errors within the software algorithm. Still more particularly, the present invention relates to an improved method of developing a software algorithm by identifying errors generated during a build of the software algorithm wherein predefined error conditions are ignored.

2. Description of the Related Art

A generalized structure for a conventional computer system includes one or more processing units connected to a system memory device (random access memory or RAM) and to various peripheral, or input/output (I/O) devices. The I/O devices typically include a display monitor, a keyboard, a graphical pointer (mouse), and a permanent storage device (hard disk). The system memory device is utilized by a processing unit in carrying out program instructions, and stores those instructions as well as data values that are fed to or generated by the programs. A processing unit communicates with the other components by various means, including one or more interconnects (buses), or direct access channels. A computer system may have many additional components, such as serial and parallel ports for connection to, e.g., printers, and network adapters. Other components might further be utilized in conjunction with the foregoing; for example, a display adapter might be utilized to control a video display monitor, and a memory controller can be utilized to access the system memory, etc.

With reference now to the figures, and in particular with reference to FIG. 1, the basic structure of a conventional data processing system 10 is depicted. Data processing system 10 has at least one central processing unit (CPU) or processor 12 which is connected to several peripheral devices, including input/output devices 14 (such as a display monitor, keyboard, and graphical pointing device) for the user interface, a permanent memory device 16 (such as a hard disk) for storing the data processor's operating system and user programs, and a temporary memory device 18 (such as random access memory or RAM) that is utilized by processor 12 to carry out program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and USB ports for connection to, e.g., modems or printers. Those skilled in the art will further appreciate that there are other components that might be utilized in conjunction with those shown in the block diagram of FIG. 1; for example, a display adapter connected to processor 12 might be utilized to control a video display monitor, and a memory controller may be utilized as an interface between temporary memory device 18 and processor 12. Data processing system 10 also includes firmware 24 whose primary purpose is to seek out and load an operating system from one of the peripherals (usually permanent memory device 16) whenever data processing system 10 is first turned on.

The operation of data processing systems of the type depicted in FIG. 1 is well known in the art. Program information comprising instructions and/or data is stored on permanent memory device 16 and may be selectively copied into temporary memory device 18 once data processing system 10 is powered on. Processor 12 executes the instructions within such program information and generates text or graphical information for presentation on display output device connected via graphics adapter, where the information may be viewed by a user. The user may selectively control operation of data processing system 10 through input entered on one of input/output devices 14.

A software algorithm is accordingly a set of program instructions which are adapted to perform certain functions by acting upon, or in response to, the I/O devices. Program instructions that are carried out by the processor are, at that lowest level, binary in form, i.e., a series of ones and zeros. These executable (machine-readable) program instructions are produced from higher-level instructions written in a programming language. The programming language may still be low-level such as assembly language (which is difficult to use since instructions appear as hexadecimal bytes), or may be a higher level language in which instructions are created utilizing more easily understood words and symbols. During the development stage of a software algorithm, a programmer creates a series of lines of code. This code is usually completed in text format. To enable the code to be utilized within a data processing system, the code must first be converted into a format which can be understood/interpreted by the data processing system. The process for converting the code into "machine readable code" is known as compilation. Compilation is the process of translating a source program into an executable program or object code. Object code is executable machine code or a variation of machine code. During compilation, a program expressed in a high-level language is translated into a computer program or machine language program expressed in intermediate language, an assembly language, or a machine language.

Software build is a process of creating a configuration file for execution of a software algorithm. This build process usually coincides with the compilation step in program development. During the build process, a log file is generated in which elements related to the success of the build are stored. Among these elements are errors, error conditions and error strings (collectively called errors). These errors may be fatal/serious errors (true errors) or non fatal/serious errors (ignorable errors). Some of these errors are common for every software build. A list of these common errors is known by those skilled in the art and include, for example, "error" and "fatal". Errors in ASCII files are usually defined as strings within the file when it is compiled. The success of a software build may be determined by searching the generated log file for a series of known error conditions or user defined error strings.

Searching for these errors is traditionally done utilizing search engines such as global regular expression print (Grep) or SCAN. These search engines produce matches based on a character string analysis. Grep is a standard UNIX based search tool which looks inside files and searches for a series of characters/strings. Every time it finds a line that contains the specified characters, it displays the line on screen. If it is looking in more than one file, it also tells the name of the file in which the characters occur. The user controls which files to look in and which characters to look for. Grep also distinguishes between uppercase and lowercase letters and can be run in the background.

The grep command is utilized primarily to find one or more files which contain a known string when the name of the file containing the information is unknown. It can be utilized to check all the files in a directory or a single file. Recent applications of grep include being utilized by software developers to search for known error conditions in build files.

In searching build files, grep and other traditional search tools, typically produce all potentially relevant "hits" but leave it up to the builder to determine which ones are real and what can be ignored. For example, a common error log search is for OS/2 system errors such as "SYS"xxxx", like:

SYS0002: The system cannot find the file specified.

Unfortunately, many builds have MAKEFILEs that attempt to delete files that don't exist, creating output such as this:

erase bob.obj

SYS0002: The system cannot find the file specified. This type of error is generally ignored by the programmer, although it is necessary to consider some other types of SYS0002 errors.

These traditional tools merely locate error strings and bring the candidates to the attention of the developer. They do not determine the characteristics of the found candidates. A second analysis is required to determine which matches are true errors and which can be ignored or overlooked. Presently, these tools do not have the capability to determine whether or not the found strings are legitimate errors and this analysis is completed manually.

It is desirable, therefore, to have a tool which searches build output log files and locates errors but which is intelligent enough to analyze the found errors and ignore those errors which the user determines are ignorable.

SUMMARY OF THE INVENTION

It is therefore one objective of the present invention to provide an improved method and system for developing software algorithms for a data processing system.

It is another objective of the present invention to provide an improved method and system for developing software algorithms for a data processing system by identifying errors within the software algorithm.

It is yet another objective of the present invention to provide an improved method and system for developing a software algorithm by identifying errors generated during a build of the software algorithm wherein predefined error conditions are ignored.

The foregoing objects are achieved as is now described. A method is disclosed for identifying predefined error conditions in a build output log file to determine if software build is defective. An output log file is generated within a storage device of a data processing system during a build of a software algorithm on the data processing system. A user creates a list file on the data processing system containing predefined valid error conditions. The output log file is searched to identify user-defined strings from the list file. A comparison of the user-defined strings identified during the search is made with a set of predefined valid error conditions to determine when the user-defined strings identified matches the predefined valid conditions.

In a preferred embodiment of the invention, the identified user-defined strings are ignored when they match a predefined valid error condition. Those identified user-defined strings which do not match a predefined valid error condition are recorded and the user is presented with a list of the recorded strings at the end of the process.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
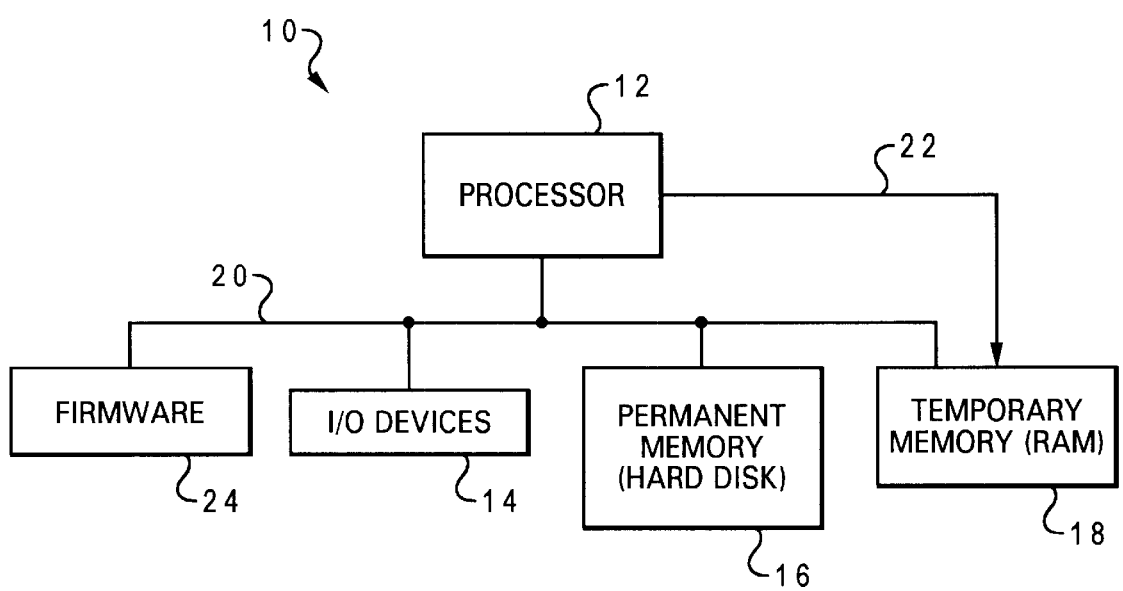
FIG. 1 is a diagram of a data processing system utilized in one embodiment of the present invention.

Turning now to the present invention. In the preferred embodiment, this invention is implemented as a software algorithm, "Errorlog," on a data processing system. Errorlog determines if software build is unsuccessful due to errors through automated scanning of output logs. It determines if phases of a build are successful, facilitating an automated jump to the next phase.

In the preferred embodiment, Errorlog is utilized to scan ASCII files (such as build output logs) for users defined error strings. It can be told by a user to omit or ignore certain error conditions. For example, a user could implement a string search to look for "SYS0002", but specify that it should ignore cases where the previous line was an "erase" or "del" command.

Errorlog processes a set of log files, searching each log for user defined strings. It examines each found string or "hit". If the hit matches a user defined valid condition, it is ignored. Otherwise, it is recorded. For the purposes of this invention, it is understood that a hit may be a direct hit or a close hit. A direct hit involves a verbatim representation of the string including spaces, punctuation, etc. A close hit permits any representation which is not direct but has some semblance of similarity to the string. At its conclusion, Errorlog will state whether or not any unresolved hits remain, in the preferred embodiment. This yes/no result can be utilized, for example, to determine whether or not a build is broken should stop or if it can proceed.

Errorlog is driven by a user defined error descriptor file. This file describes the set of conditions to search for such as the word "error". Under each search condition, in the preferred embodiment, a user may optionally describe conditions to ignore. In the preferred embodiment, the conditions to ignore are called valid descriptors and several valid descriptors can be listed for each search descriptor. Both search and valid descriptors may contain meta characters, such as '?', for any single character, '–', for a single non-space character, and '*' for any number of characters. They can also be case sensitive or insensitive.

In one embodiment of the invention, Errorlog is driven by errorlog.lis, a user supplied error descriptor file. This file describes which error strings to search for and, when finding a hit, what conditions to ignore. One embodiment of a simple errorlog.lis file is as follows:

```
/* Errorlog.lis */
SearchString: *'error'*            Case Sensitive: no
/*                                            */
/* Valid Strings:      Range                  */
/*                     From  To   Case        */
/*                     (-)   (*)  Sen?        */
/*                                            */
*'0 Severe Errors'*    0     0    Y
```

In this illustrative embodiment, the first line is a comment, started by the characters '/*'. The second line is a search descriptor, marked by the string SearchString. In this embodiment, a search for lines containing the string "error" is conducted. The wildcard character '*' means anything can proceed or follow the string "error" in the line. The Case Sensitive field determines if searches are limited to an exact upper or lower case match.

The last line starts the series of potential valid descriptors. A valid descriptor tells which search hits should be considered valid, and should thus be ignored or omitted in error checking.

The error descriptor file has the following abstract/general format:

SearchDescriptor 1
   Valid Descriptor 1a
/* Comment */
Search Descriptor 2
   Valid Descriptor 2a
   Valid Descriptor 2b
   Valid Descriptor 2c The file contains a series of search descriptors, optionally followed by their valid descriptors. These search descriptors define the strings to search for that would signal an error, such as "error", "invalid", "stop", etc. The SearchString command is followed by the actual string to look for.

The valid descriptors are optional lines which follow a search descriptor. They detail which cases to ignore or overlook given a search descriptor 'hit'. In the preferred embodiment, valid descriptors correspond to the preceding search descriptor. Any number of valid descriptors may follow a search descriptor. In the above illustrative example, valid descriptor 1a applies to search descriptor 1 and valid descriptors 2a–2c each apply to search descriptor 2. In the preferred embodiment, any line that is not a search descriptor or comment is considered a valid descriptor.

In the preferred embodiment, the format of a valid descriptor includes the following fields:

String Literal and Wildcard: Text to search for in a Search Descriptor "hit" that would signal this as a valid case. In other words, ignore any search hit that contains this text;

Range: Examines lines above and below the search hit for the specified text. Allows user to say, "If a given condition is found within a range of the hit, ignore it";

Up Case Sensitive: If "Y", the valid descriptor text must exactly match case with the search hit to be considered valid or overlooked;

This File Only: Valid descriptor only applies to a particular log file. Utilized when user wants to overlook a particular error in one file (or file directory), but not in all cases. Most often used when invoking ERRORLOG on a number of files.

In the preferred embodiment, Errorlog is invoked with the following parameters: "Errorlog [logs or files to search] <error descriptor file></d>." The default error descriptor file is errorlog.lis.

In the preferred embodiment, Errorlog provides an output of the true errors to the user with the line numbers and error strings via an output to a screen and/or a file. Errorlog returns a value of 0 or 1. A '0' signifies no error strings found or that all found were resolved/valid/ignored by matching valid descriptor strings. A '1' signifies errors found with no matching valid descriptor string. This makes it convenient for Errorlog to be called from other build programs. In the preferred embodiment, Errorlog also produces an output which contains a list of scanned files having unresolved errors. For each file a list of unresolved errors is produced. The output is only produced when unresolved errors are found.

Figure 2:
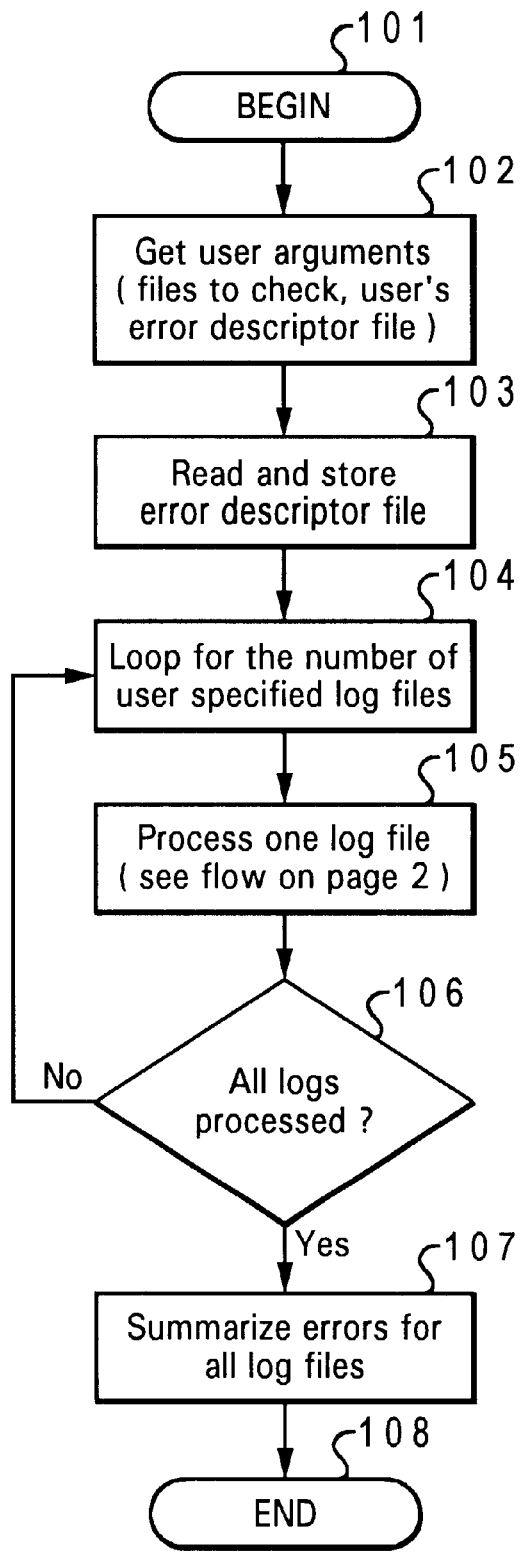
FIG. 2 is a logic flow chart of the general processing of a series of output log files in accordance with one embodiment of the present invention.

Returning now to the figures and in particular with reference to FIG. 2, there is depicted a logic flow of the processing of a series log files. The process begins (step 101) with the user entering the arguments. These arguments, which include a list of files to check and the user's descriptor file, are received by the process (step 102). The process then reads and stores the error descriptor file (step 103). A loop is established with a count equal to the number of user specified log files (step 104). The process then processes one log file at a time (step 105) and loops until each of the files has been processed. Once all the log files have been processed (step 106), the process summarizes errors for all the log files (step 107). The process then terminates (step 108).

Figure 3:
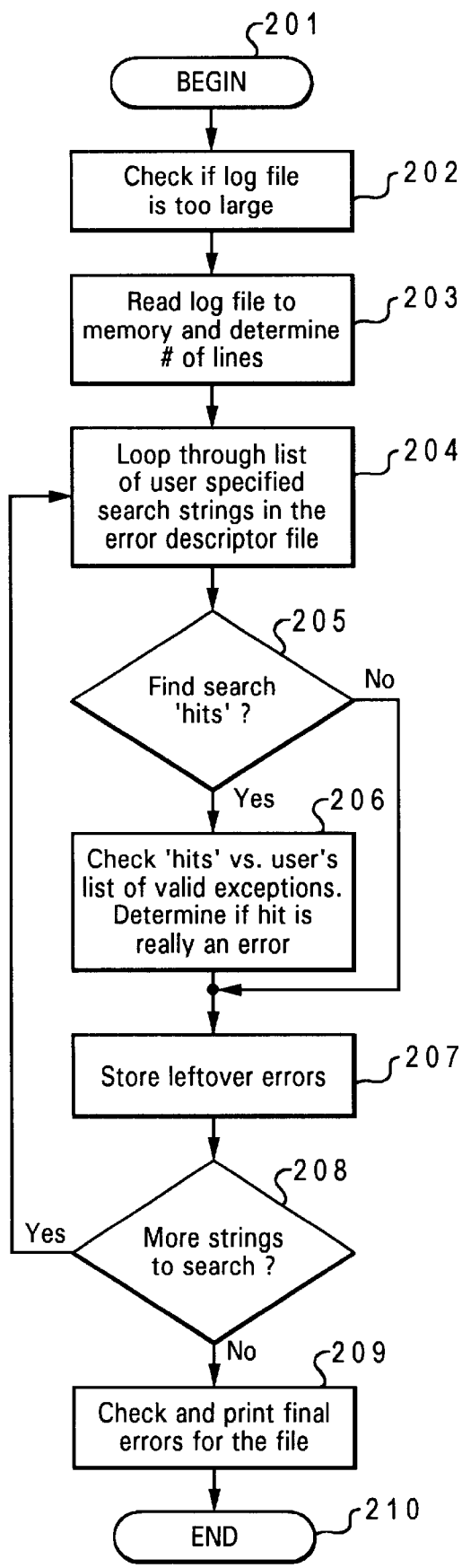
FIG. 3 is a logic flow chart of the searching for and analyzing of error strings in one output log file according to one embodiment of the present invention.

FIG. 3 is the logic flow for the actual processing of the log file. It begins when a log file is entered as an argument (step 201). An initial check is made to determine if the log file is too large (step 202). The log file is then read to memory and the number of lines ascertained (step 203). A loop is then established with a count equal to the number of user specified search strings in the error descriptor file (step 204). Each user specified search string is selected and compared to the strings in the log file. If any hits are found (step 205), each hit is checked/compared against the user's list of valid exceptions (step 206). This determines if the 'hit' is really an error (true error). Left over errors from the process are stored (step 207).

Following this check/comparison of the user specified search string, the process checks the loop count to determine if there are any more user specified search strings (step 208). If there are, the process loops back and begins a check of the next user specified search string in the list. If there are no more user specified search strings in the list, then the process checks and prints final errors for the file (step 209). The process then terminates (step 210).

While the invention has been particularly shown and described with reference to a preferred embodiment, it will be understood by those skilled in the art that various changes in form and detail may be made therein without departing from the spirit and scope of the present invention. For example, although the embodiment allows the user to define which errors are true errors, the process can be run automatically by providing it with its own internal database of errors strings.

What is claimed is:

1. A method for identifying predefined error conditions in a build output log file, the method comprising the steps of:

generating an output log file in a storage device of a data processing system during compilation of a software routine on said data processing system;

creating a list file on said data processing system of predefined valid error conditions;

searching said output log file to identify user-defined strings; and comparing said identified user-defined strings with said predefined valid error conditions to determine when said identified user-defined strings match said predefined valid error conditions, wherein validity of a match between said user-defined strings and said predefined valid error conditions is determined based on a pre-specified level of exactness, said level of exactness ranging from a literal match for a selected number of characters to a non-literal match having some equivalence of characters with a number of characters of said user-defined strings.

2. The method of claim 1, wherein said comparing step further includes the steps of:
ignoring said identified user-defined string when said identified user-defined string matches a predefined valid error condition;
recording said identified user-defined string when said identified user-defined string does not match a predefined valid error condition; and
informing a user when said identified user-defined string does not match a predefined valid condition utilizing an output device of the data processing system.

3. The method of claim 2, wherein said informing step includes the step of providing a list of any unresolved error conditions remaining at end of said output log file.

4. The method of claim 1, wherein said user-defined strings in said comparing step correspond to known error conditions.

5. The method of claim 1, wherein said comparing step further includes the step of scanning ACSII files for user-defined error strings utilizing a user-defined error descriptor file.

6. The method of claim 5, wherein said user-defined error descriptor file describes a set of conditions to search for including error strings and describes conditions to ignore.

7. The method of claim 1, wherein said searching step further includes the steps of:
identifying SYS0002 errors; and
ignoring any of said SYS0002 errors which follow a line containing a deletion command.

8. The method of claim 1, wherein said valid condition in said creating step is a part of a search description and further wherein said valid condition includes a range, said range being a predefined number of lines above and below said user-defined error condition for a specified text.

9. The method of claim 1, wherein said comparing step is invoked on a plurality of output log files wherein said step further includes the step of:
overlooking user-defined error strings in a subset of said plurality of output log files; and
progressing automatically from one file to the next in said plurality of output log files.

10. A system for identifying predefined error conditions in a build output log file to determine if software build is defective comprising:
means for generating an output log file in a storage device of a data processing system during building of a software routine on said data processing system;
means for creating a list file on said data processing system of predefined valid error conditions;
means for searching said output log file to identify user-defined strings; and
means for comparing said user-defined strings identified in said searching step with said predefined valid conditions to determine when said user-defined strings identified matches said predefined valid conditions, wherein validity of a match between said user-defined strings and said pre-defined valid error conditions is determined based on a pre-specified level of exactness, said level of exactness ranging from a literal match for a selected number of characters to a non-literal match having some equivalence of characters with a number of characters of said user-defined strings.

11. The system of claim 10, wherein said comparing means further includes:
means for ignoring said identified user-defined string when said identified user-defined string matches a predefined valid error condition;
means for recording said identified user-defined string when said identified user-defined string does not match a predefined valid error condition; and
means for informing a user when said identified user-defined string does not match a predefined valid condition utilizing an output device of the data processing system.

12. The system of claim 11, wherein said informing means includes means for providing a list of any unresolved error conditions remaining at end of said output log file.

13. The system of claim 10, wherein said user-defined strings in said comparing means correspond to known error conditions.

14. The system of claim 10, wherein said comparing means further includes means for scanning ACSII files for user-defined error strings utilizing a user-defined error descriptor file.

15. The system of claim 14, wherein said user-defined error descriptor file describes a set of conditions to search for including error strings and describes conditions to ignore.

16. The system of claim 10, wherein said searching means further includes:
means for identifying SYS0002 errors; and
means for ignoring any of said SYS0002 errors which follow a line containing a deletion command.

17. The system of claim 10, wherein said valid condition in said creating means is a part of a search description and further wherein said valid condition includes a range, said range being a predefined number of lines above and below said user-defined error condition for a specified text.

18. The system of claim 10, wherein said comparing means is invoked on a plurality of output log files wherein said means further includes:
means for overlooking user-defined error strings in a subset of said plurality of output log files; and
means for progressing automatically from one file to the next in said plurality of output log files.

19. A computer program product for identifying predefined error conditions in a build output log file to determine if software build is defective, said program product comprising:
a computer readable medium; and
program instructions on said computer readable medium for:
generating an output log file in a storage device of a data processing system during building of a software routine on said data processing system;
creating a list file on said data processing system of predefined valid error conditions;
searching said output log file to identify user-defined strings; and
comparing said user-defined strings identified in said searching step with said predefined valid conditions to determine when said user-defined strings identified matches said predefined valid conditions, wherein validity of a match between said user-defined strings and said pre-defined valid error conditions is determined based on a pre-specified level of exactness, said level of exactness ranging from a literal match for a selected number of characters to a non-literal match having some equivalence of characters with a number of characters of said user-defined strings.

20. The computer program product of claim 19, said program instructions for said comparing further includes program instructions for:

ignoring said identified user-defined string when said identified user-defined string matches a predefined valid error condition;

recording said identified user-defined string when said identified user-defined string does not match a pre-defined valid error condition; and informing a user when said identified user-defined string does not match a predefined valid condition utilizing an output device of the data processing system.

21. The computer program product of claim 20, said program instructions for said informing includes program instructions for providing a list of any unresolved error conditions remaining at end of said output log file.

22. The computer program product of claim 19, said user-defined strings in said program instructions for said comparing correspond to known error conditions.

23. The computer program product of claim 19, said program instructions for said comparing further includes program instructions for scanning ACSII files for user-defined error strings utilizing a user-defined error descriptor file.

24. The computer program product of claim 22, wherein said user-defined error descriptor file describes a set of conditions to search for including error strings and describes conditions to ignore.

25. The computer program product of claim 19, program instructions for said searching further includes program instructions for:

identifying SYS0002 errors; and ignoring any of said SYS0002 errors which follow a line containing a deletion command.

26. The computer program product of claim 19, wherein said valid condition in said program instructions for said creating is a part of a search description and further wherein said valid condition includes a range, said range being a predefined number of lines above and below said user-defined error condition for a specified text.

27. The computer program product of claim 19, said program instructions for said comparing is invoked on a plurality of output log files wherein said comparing program instructions further includes program instructions for:

overlooking user-defined error strings in a subset of said plurality of output log files; and progressing automatically from one file to the next in said plurality of output log files.

* * * * *